US010857645B2

(12) United States Patent
Schadow et al.

(10) Patent No.: US 10,857,645 B2
(45) Date of Patent: Dec. 8, 2020

(54) HAND-HELD POWER TOOL HAVING AT LEAST ONE MACHINE-SIDE CONTACT ELEMENT

(71) Applicant: Robert Bosch GmbH, Stuttgart (DE)

(72) Inventors: Joachim Schadow, Stuttgart (DE); Joern Stock, Leinfelden-Echterdingen (DE); Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 327 days.

(21) Appl. No.: 15/763,228

(22) PCT Filed: Sep. 19, 2016

(86) PCT No.: PCT/EP2016/072169

§ 371 (c)(1),
(2) Date: Mar. 26, 2018

(87) PCT Pub. No.: WO2017/055125

PCT Pub. Date: Apr. 6, 2017

(65) Prior Publication Data

US 2018/0272494 A1 Sep. 27, 2018

(30) Foreign Application Priority Data

Sep. 29, 2015 (DE) ........................ 10 2015 218 713
Sep. 6, 2016 (DE) ........................ 10 2016 216 794

(51) Int. Cl.
*B24B 23/02* (2006.01)
*B25F 5/02* (2006.01)
(Continued)

(52) U.S. Cl.
CPC ............ *B24B 23/028* (2013.01); *B24B 49/08* (2013.01); *B24B 49/10* (2013.01); *B24B 55/052* (2013.01); *B25F 5/026* (2013.01)

(58) Field of Classification Search
CPC ..... B24B 23/028; B24B 49/08; B24B 55/052; B25F 5/026
(Continued)

(56) References Cited

U.S. PATENT DOCUMENTS 5,231,727 A * 8/1993 Armbruster ............. B24B 23/00 15/144.1
6,155,916 A * 12/2000 Rudolf .................... B25F 5/026 451/344
(Continued)

FOREIGN PATENT DOCUMENTS

DE 10 2004 003 202 A1 8/2005
DE 10 2009 027 871 A1 1/2011
(Continued)

OTHER PUBLICATIONS

International Search Report corresponding to PCT Application No. PCT/EP2016/072169, dated Nov. 18, 2016 (German and English language document) (7 pages).

*Primary Examiner* — George B Nguyen
(74) *Attorney, Agent, or Firm* — Maginot, Moore & Beck LLP

(57) ABSTRACT

A hand-held power tool includes a gearing housing part and accessory equipment. The gearing housing part has at least one machine-side contact element. The accessory equipment has at least one accessory-equipment-side contact element. The machine-side contact element and the accessory-equipment-side contact element can be releasably connected to each other.

20 Claims, 12 Drawing Sheets

(51) Int. Cl.
*B24B 49/10* (2006.01)
*B24B 55/05* (2006.01)
*B24B 49/08* (2006.01)

(58) Field of Classification Search
USPC ........................................ 451/359; 83/62, 6.1
See application file for complete search history.

(56) References Cited

U.S. PATENT DOCUMENTS

| | | | | |
|---|---|---|---|---|
| 6,241,594 | B1 * | 6/2001 | Lepold .................. | B24B 23/005 451/357 |
| 9,007,007 | B2 | 4/2015 | Koeder | |
| 10,422,088 | B2 * | 9/2019 | Gustavsson ............ | B28D 7/005 |
| 2002/0151262 | A1 * | 10/2002 | Berger ................. | H01R 39/385 451/358 |
| 2004/0187443 | A1 * | 9/2004 | Michel .................... | B29C 51/46 53/453 |
| 2005/0136814 | A1 * | 6/2005 | Rudolf ...................... | B25F 5/00 451/359 |
| 2006/0219419 | A1 | 10/2006 | Sugiyama et al. | |
| 2007/0197152 | A1 * | 8/2007 | Jerdee ..................... | B24B 23/02 451/359 |
| 2008/0090504 | A1 * | 4/2008 | Trautner ................. | B24B 23/00 451/359 |
| 2009/0175694 | A1 * | 7/2009 | Craig ................... | G05B 19/124 407/37 |
| 2014/0231113 | A1 | 8/2014 | Steurer | |
| 2015/0065018 | A1 * | 3/2015 | Livingston .............. | F16H 15/08 451/359 |
| 2015/0148937 | A1 * | 5/2015 | Wolf ..................... | B24B 23/028 700/164 |
| 2015/0158138 | A1 * | 6/2015 | Radif .................... | B24B 23/026 451/359 |
| 2015/0202738 | A1 * | 7/2015 | Boeck ................... | B24B 55/052 451/359 |
| 2016/0176007 | A1 * | 6/2016 | Wolf ....................... | B24B 23/02 451/28 |

FOREIGN PATENT DOCUMENTS

| | | | |
|---|---|---|---|
| DE | 10 2013 202 832 | A1 | 8/2014 |
| DE | 10 2013 215 821 | A1 | 2/2015 |
| EP | 1 741 521 | A1 | 1/2007 |
| GB | 2 410 205 | A | 7/2005 |
| GB | 2461992 | A | 1/2010 |
| WO | 2015/014524 | A1 | 2/2015 |

* cited by examiner

HAND-HELD POWER TOOL HAVING AT LEAST ONE MACHINE-SIDE CONTACT ELEMENT

This application is a 35 U.S.C. § 371 National Stage Application of PCT/EP2016/072169, filed on Sep. 19, 2016, which claims the benefit of priority to Serial Nos. DE 10 2015 218 713.6, filed on Sep. 29, 2015 and DE 10 2016 216 794.4, filed on Sep. 6, 2016 in Germany, the disclosures of which are incorporated herein by reference in their entirety.

The disclosure relates to a hand-held power tool having at least one machine-side contact element.

BACKGROUND

Hand-held power tools, in particular angle grinders, are already known from the prior art.

SUMMARY

The hand-held power tool according to the disclosure having the features of the claims is realized, in particular, as an angle grinder. In the case of hand-held power tools of this type, there is a particular requirement to increase safety for an operator of the hand-held power tool. This includes, inter alia, monitoring of whether safety-relevant accessories, such as protective hood or an ancillary handle, are fitted.

The hand-held power tool according to the disclosure has at least one transmission housing part. The transmission housing part is assigned to a housing of the hand-held power tool. The transmission housing may be realized so as to constitute a single piece with the housing of the hand-held power tool. The housing of the hand-held power tool may, besides the transmission housing part, further housing parts such as, for example, a motor housing and a handle housing. According to the disclosure, a safety-relevant accessory has at least one accessory-side contact element. It is proposed that the machine-side contact element and the accessory-side contact element can be releasably connected to each other. It can thus be assured, advantageously, that the safety-relevant accessory can be fitted on or to the hand-held power tool.

In particular, the machine-side and the accessory-side contact element are assigned to a detection unit, which is designed to detect mechanical fastening of the accessory to the housing of the hand-held power tool, in particular to the transmission housing part. Advantageously, it can be detected by the detection unit whether or not a safety-relevant accessory is in a fitted state on the hand-held power tool. A fitted state exists, in particular, if the machine-side contact element is connected to the accessory-side contact element. The machine-side contact element may be realized, for example, as a threaded hole for receiving an ancillary handle, or as a bearing flange for receiving a protective hood. The machine-side contact element may be realized so as to constitute a single piece with a sensor element of the detection unit. The accessory-side contact element may be realized, for example, as a threaded stem of an ancillary handle, or as a protective-hood flange.

In an advantageous embodiment, the accessory is realized as an ancillary handle. The ancillary handle is advantageously intended, in particular, to be gripped by an operator of the hand-held power tool. Thus, advantageously, safety in the use of the hand-held power tool can be increased, in that the hand-held power tool is operated with two hands. In a further advantageous embodiment, the accessory is realized as a protective hood. The protective hood is advantageously intended to protect an operator of the hand-held power tool, during operation of the hand-held power tool, against sparks and/or material particles that are produced during operation of the hand-held power tool, and/or against fragments of a disk, broken during operation, that are flung outward with great force.

The detection unit may have an electrical connection element. In particular, the machine-side and/or the accessory-side contact element may be realized as an electrical connection element. If the accessory is fastened to the hand-held power tool, the machine-side electrical contact element and the accessory-side electrical contact element are advantageously connected to each another, and close an electric circuit.

If the machine-side contact element is realized as an electrical connection element, it may advantageously close an electric circuit with the accessory-side contact element of electrically conductive material. It can thus be detected, advantageously, whether the safety-relevant accessory is fitted to or on the hand-held power tool.

The detection unit may advantageously have a capacitive proximity switch.

The detection unit may advantageously have a pressure sensor element, the pressure sensor element being designed to detect a contact pressure of the accessory onto the housing. The pressure sensor element may be realized, for example, as a strain gauge or as a piezoelectric pressure sensor. The pressure sensor element may be arranged in or on the housing of the hand-held power tool in such a manner that the accessory, in particular the accessory-side contact element, acts indirectly or directly upon the pressure sensor element. The accessory is advantageously connected to the housing of the hand-held power tool in a form-fitting manner, or in a force-fitting and form-fitting manner. Advantageously, the contact pressure is detected in a region in which the form-fit is formed.

The detection unit may have a radar sensor element. The radar sensor element is designed, in particular, to detect an approach of an object, advantageously of an accessory. If the accessory is permanently fixed at the same distance in relation to the radar sensor, the radar sensor element advantageously identifies the fitted accessory. Advantageously, the radar sensor element is likewise designed to detect specific shapes or patterns, enabling unambiguous identification of the accessory.

The detection unit may have a magnetic field sensor.

In a further advantageous embodiment, the machine-side contact element is realized as a magnetic field sensor, and the accessory-side contact element is realized as a magnet. Thus, advantageously, a magnetic circuit can be closed, and it can be detected whether the safety-relevant accessory is fitted to or on the hand-held power tool.

The magnet may be arranged in the threaded stem of the ancillary handle.

Advantageously, the hand-held power tool is equipped with an electromotive drive unit, in particular an electric motor, wherein the electromotive drive unit is arranged in a motor housing part of the hand-held power tool. The electromotive drive unit is intended, in particular, to drive a work spindle.

An electronics unit is arranged in the hand-held power tool, and is advantageously intended to supply current to the electromotive drive unit.

Advantageously, the electronics unit supplies current to the drive unit only when the machine-side contact element and the accessory-side contact element are connected to each other, the accessory being in the fitted state. Advantageously, only a drive unit of the hand-held power tool that is supplied with current can be switched on or off by an operator, by means of an operating switch. Thus, advantageously, increased safety of an operator of the hand-held power tool can be ensured.

Advantageously, in the case of a fitted accessory, at least one switching element is actuated, wherein, upon actuation of the switching element, at least one item of information, concerning whether and/or the fact that the accessory is fitted, is relayed to the electronics unit, in particular via at least one electrical conductor. It can thus be detected, advantageously, whether the safety-relevant accessory is fitted to or on the hand-held power tool.

In a further advantageous embodiment, the hand-held power tool has at least one safety element, wherein the safety element can communicate with the hand-held power tool, the electronics unit and/or a mobile device.

Further advantageous and expedient embodiment are given by the description of the figures and by the drawings.

BRIEF DESCRIPTION OF THE DRAWINGS

The drawings show embodiments of a hand-held power tool according to the present disclosure.

There are shown.

DETAILED DESCRIPTION

Components that are the same in the differing embodiments are denoted by the same references.

Figure 1:
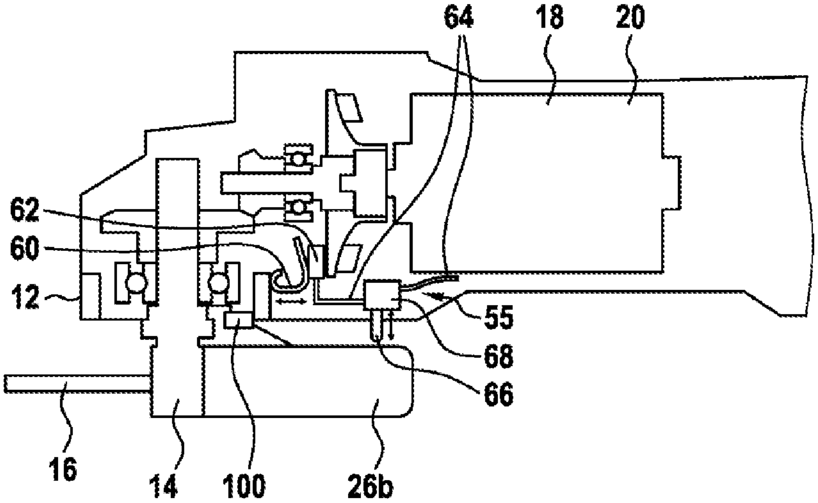
FIG. 1 an arrangement of a hand-held power tool according to the disclosure and a contact element, in a schematic representation, FIG. 2 a first detail of a hand-held power tool and a first detail of an associated accessory, in a schematic representation, FIG. 3 two embodiments of an accessory of the hand-held power tool according to the disclosure, in a schematic representation, FIG. 4 a second detail of a hand-held power tool and a second detail of an associated accessory, in a schematic representation, FIG. 5 a second embodiment of a hand-held power tool according to the disclosure, in a schematic representation, FIG. 6*a* a perspective view of a further embodiment of an accessory, FIG. 6*b* a top view of the accessory according to FIG. 6*a,*

FIG. 1 shows a hand-held power tool 10. The hand-held power tool is an angle grinder, which usually has a transmission housing part 12 that accommodates a bevel gear transmission. Projecting from the bevel gear transmission there is a work spindle 14, on which a grinding and/or cutting tool 16 is mounted. The angle grinder has a motor housing part 18 for accommodating an electromotive drive unit 20.

Figure 2:
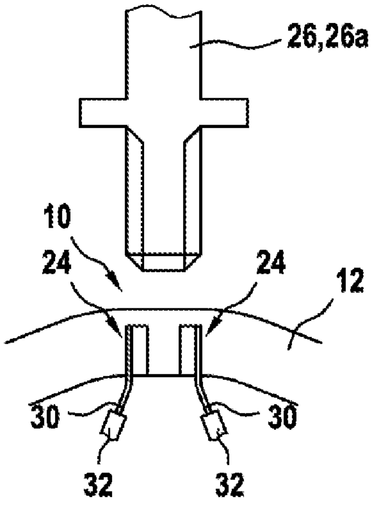

Arranged in the transmission housing part 12, as can be seen from FIG. 2, are two machine-side contact elements 24. Machine-side means that the contact elements 24 are arranged in the hand-held power tool 10. In the exemplary embodiment according to FIG. 2, the contact elements 24 are arranged in the transmission housing 12. It is also conceivable, however, for the machine-side contact elements 24 to be arranged in the motor housing part 18. It is also conceivable for more than two machine-side contact elements 24 to be arranged in the hand-held power tool 10.

An accessory 26 is intended to be connected to the hand-held power tool 10. The accessory 26 has an accessory-side contact element 28. Accessory-side means that the contact element 28 is arranged in the accessory 26 for the hand-held power tool 10. In the exemplary embodiment according to FIG. 2, the accessory 26 is an ancillary handle 26*a* for the hand-held power tool 10. The ancillary handle has a threaded stem, as an accessory-side contact element 28, which is screwed into the transmission housing 12. In the embodiment according to the disclosure, the machine-side contact elements 24 and the accessory-side contact element 28 are releasably connected to each other. When the ancillary handle 26*a* is in the fitted state, the threaded stem 28 forms an electrical bridge between the two machine-side contact elements 24.

Figure 3:
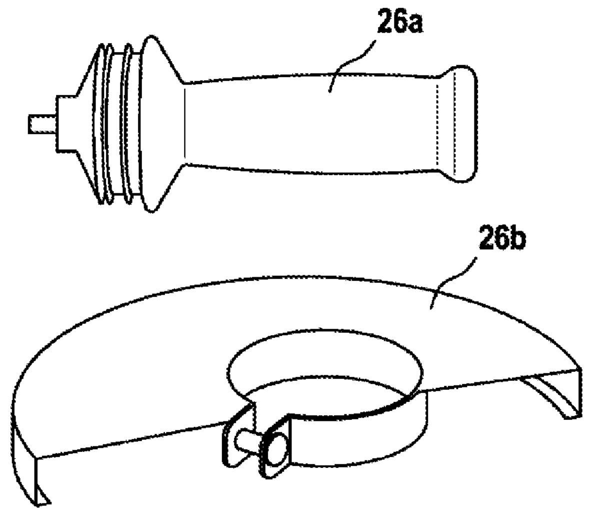

As represented in FIG. 3, the accessory 26 for the hand-held power tool 10 is realized as an ancillary handle 26*a* or as a protective hood 26*b*. The ancillary handle 26*a* intended to be gripped by an operator of the hand-held power tool, such that the hand-held power tool 10 must be operated with two hands.

The function of the protective hood 26*b* to protect an operator of the hand-held power tool 10, during operation of the hand-held power tool 10, against sparks and/or material particles that are produced during operation of the hand-held power tool, and/or against fragments of a disk, broken during operation, that are flung outward with great force.

The machine-side contact elements 24 and the accessory-side contact elements 28 are electrical contact elements. Electrical contact elements, when connected, close an electric circuit.

Thus, in the exemplary embodiment in FIG. 2, the machine-side contact elements 24 are two electrical connections 30, each having a cable 32 for insulation, which are arranged in the transmission housing part 12. The accessory-side contact element 28, which a threaded stem 28, is composed of an electrically conductive material such as, for example, a metal. In the fitted state, the threaded stem 28 is connected to the two electrical connections 30.

If the transmission housing part 12 is composed of an electrically conductive material, it must be ensured that no short circuit occurs between the contact elements 24, 28 and the transmission housing part 12. For this purpose, the contact elements 24, 28 are insulated with respect to the transmission housing part 12.

Figure 4:
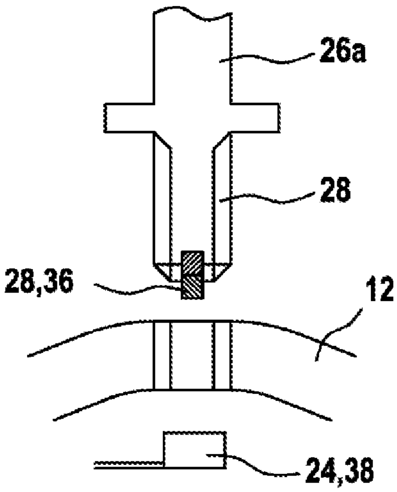

In a further embodiment, according to FIG. 4, the accessory-side contact element is a magnet 36, which is arranged on the threaded stem 28 of the ancillary handle 26*a*. The machine-side contact element 24 is a magnetic field sensor 38. The magnetic field sensor 38 identifies whether the threaded stem 28 having the magnet 38 is connected to the transmission housing 12.

As shown by FIG. 1, the electromotive drive unit 20 is realized as an electric motor, which is intended to drive the work spindle 14.

An electronics unit 55 is arranged in the motor housing part 18 of the hand-held power tool 10, and is intended to supply current to the electromotive drive unit 20.

The electronics unit 55 in this case identifies whether the electric or magnetic circuit is closed, i.e. whether the accessory 26 is fitted to or on the hand-held power tool.

FIG. 1 shows two variants, in which the fitting of the protective hood 26*b* is queried.

The protective hood 26*b* has a protective-hood band, not represented. If the protective hood 26*b*, and consequently the protective-hood band, is fitted on the hand-held power tool 10, a lever element 60 is moved. The lever element 60 in this case is realized as a stirrup. The lever element 60 in this case actuates a first switching element 62. The first switching element 62 is, for example, a microswitch or the like. Upon actuation of the first switching element 62, the information that the protective hood 26*b* is fitted is relayed to the electronics unit 55, via two electrical conductors 64.

In the second variant, a thrust- and/pressure element 66 projects out of the transmission housing 12 of the hand-held power tool 10. The thrust- and/pressure element & more precisely 66 in this case is realized as a plunger, and extends onto the protective hood 26*b*. If the protective hood 26*b* is fitted onto the hand-held power tool 10, the pusher 66 is actuated. The pusher 66 in this case actuates a second switching element 68. The second switching element 68 is, for example, a microswitch or the like. Upon actuation of the second switching element 68, the information that the protective hood 26*b* is fitted is relayed to the electronics unit 55, via the electrical conductors 64.

The electronics unit 55 supplies current to the drive unit 20 of the hand-held power tool 10 only when the contact elements are connected to each other, the accessory 26 being in state of having been fitted to or on the hand-held power tool 10.

Figure 5:
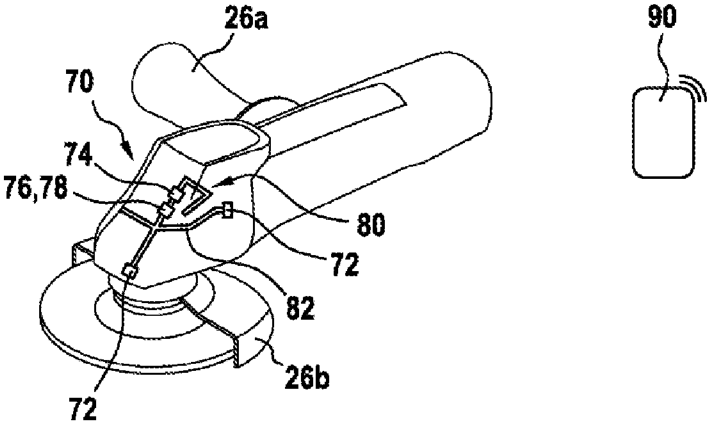

FIG. 5 shows a further embodiment according to the disclosure. The hand-held power tool 10 has a safety element 70. The safety element 70 comprises elements such as switches, microswitches, sensor elements 72 and the like, in order to identify a fitted accessory 26 such as an ancillary handle 26*a* and/or a protective hood 26*b* or the like. The safety element 70 furthermore has an energy supply unit 74, a data evaluation unit 76, a storage unit 78, a communications unit 80 or the like. The elements are connected to each other via at least one cable 82.

The safety element 70 communicates with the electronics 55 via radio communication, for example via BT, BLE, NFC, WLAN or the like.

Contact elements may also be provided on the hand-held power tool, and communication may be effected via the contact elements. The contact elements in this case may be mounted on the protective hood, on the protective-hood band. It is also conceivable, however, that the contact elements can be fastened to another location on the protective hood, considered appropriate by persons skilled in the art.

Apart from the identification of the accessory, the safety element 70 may identify and/or record parameters such as, for example, a temperature, a vibration or the like, and communicate these to the electronics unit 55. The electronics unit 55 of the hand-held power tool 10 evaluates the parameters and if necessary initiates one of the following actions: setting of rotational speed, adaptation of power output, additional cooling, display of the parameters of the hand-held power tool, or the like.

The safety element 70 may communicate with a mobile device 90. The safety element 70, the mobile derive 90 and the hand-held power tool 10 in this case constitute a network. The mobile device 90 is realized, for example, as a smartphone, smartband or the like. In particular, the mobile derive may have access to the Internet or to another network. The network is, in particular, a site in which safety settings can be effected, managed and monitored.

Figure 6A:
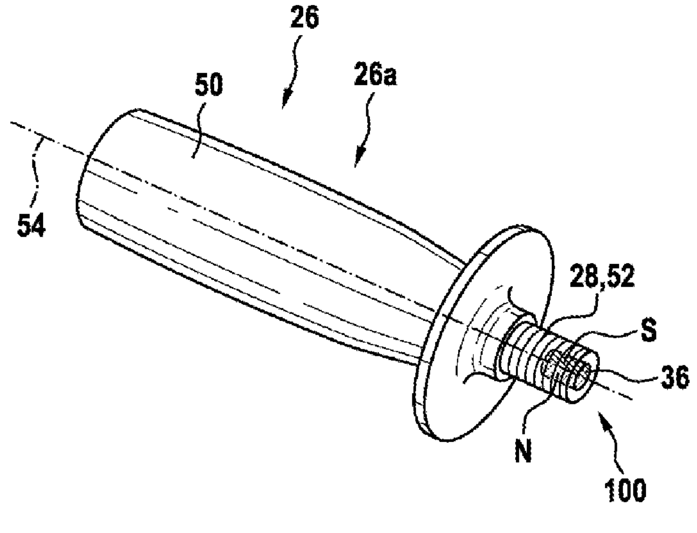
FIG. 6*c* an alternative embodiment of the accessory according to FIG. 6*a,*
FIG. 6*d* a further alternative embodiment of the accessory according to FIG. 6*a-c,*
FIG. 6*e* a top view of the accessory according to FIG. 6*d,*
FIG. 6*f* a top view of further alternative embodiment of the accessory according to FIG. 6*a-e,*
FIG. 6*g* a detail of a hand-held power tool having a detection unit.
FIG. 6*h* a detail of a hand-held power tool having a detection unit, having an arrangement of the detection unit that differs from FIG. 6*g,*
FIG. 6*i* a perspective view of a further embodiment of a protective hood.
FIG. 6*j* a perspective view of an alternative embodiment of the protective hood according to FIG. 6*i,*
FIG. 6*k* a perspective view of a further alternative embodiment of the protective hood according to FIG. 6*i-j,*
FIG. 6*l* a detail of a further embodiment of a hand-held power tool.
Figure 6B:
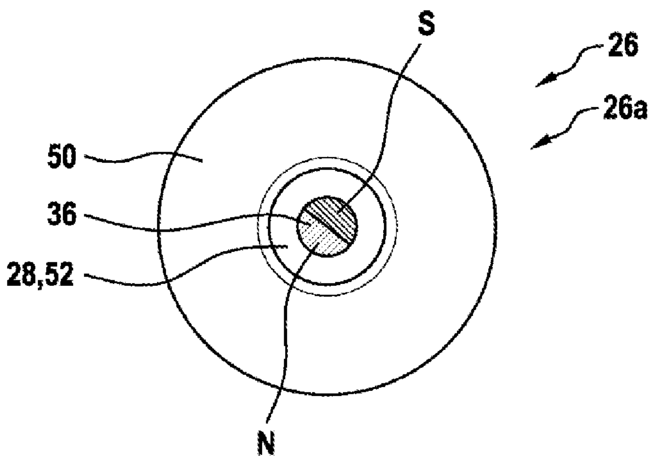
Figure 6C:
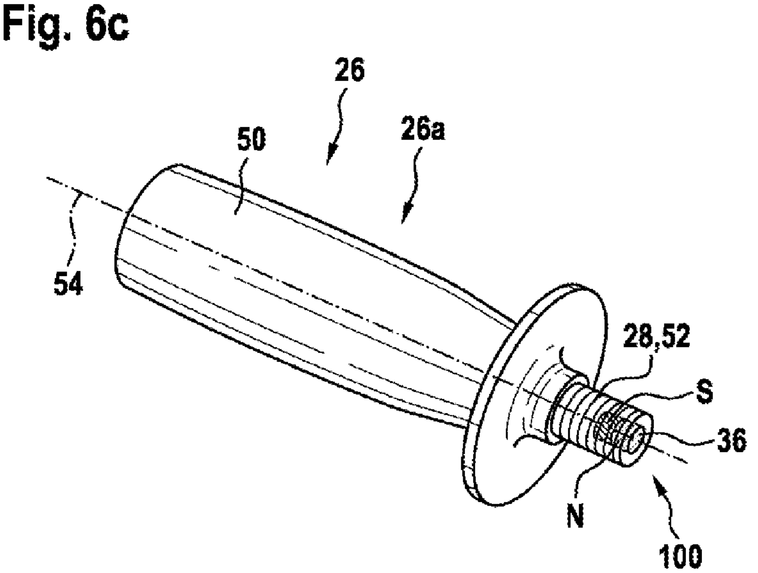
Figure 6D:
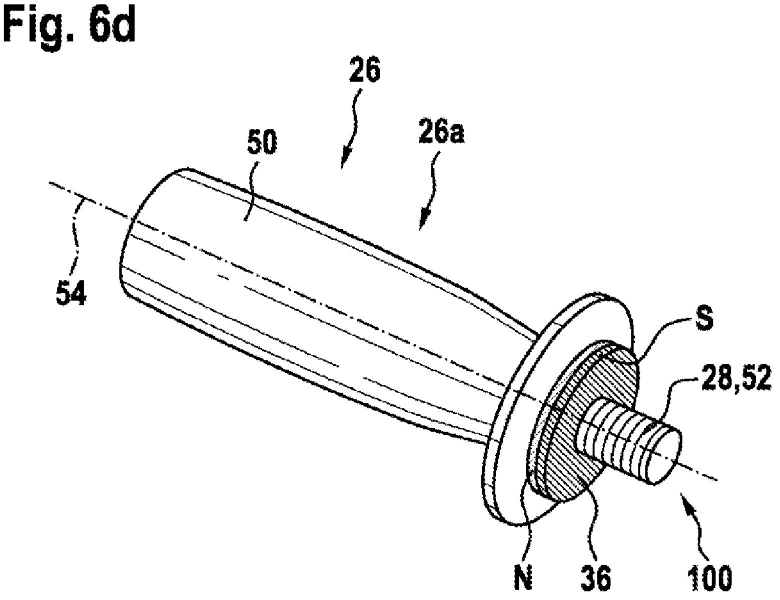
Figure 6E:
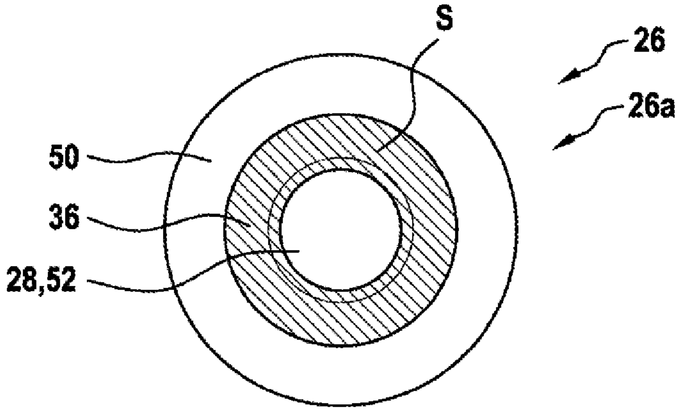
Figure 6F:
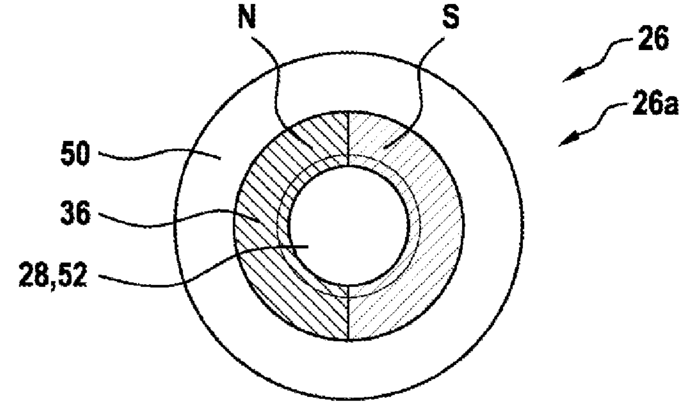

A hand-held power tool 10 having an accessory 26 and having a detection unit 100 is shown in FIG. 6*a-l*. The detection unit 100 comprises at least one magnetic field sensor 38 and at least one magnet 36. The accessory 26 is realized as an ancillary handle 26*a*, which comprises a grip part 50 and a threaded stem 52. The threaded stem 52 is realized as an accessory-side contact element 28. The detection unit 100 has a magnet 36 that is arranged, at an end face, in the threaded stem 52 of the ancillary handle 26*a* (see FIG. 6*a*). The magnet 36 is arranged, exemplarily, in the accessory-side contact element 28 in such a manner that a plane through the boundary surface between the north pole and the south pole of the magnet 36 extends substantially parallel to the longitudinal extent 54 of the ancillary handle. A top view of the arrangement of the magnet 36 according to FIG. 6*a* is shown in FIG. 6*b*. Alternatively, it is also conceivable that the plane through the boundary surface between the north pole and the south pole of the magnet 36 extends substantially perpendicularly in relation to the longitudinal extent 54 of the ancillary handle 26*a*, as shown exemplarily in FIG. 6*c*. It is likewise conceivable, in an alternative embodiment, for the magnet 36 to be arranged around the accessory-side contact element 28, in particular around the threaded stem 52, as shown in FIG. 6*d-f*. Advantageously, the magnet 36 is realized in the form of a ring. The magnet 36 lies on the grip part 50. As with the previous embodiment, differing orientations of the magnet 36 are conceivable, which are shown in FIGS. 6*e* and *f*. In FIG. 6*e*, the plane through the boundary surface between the north pole and the south pole of the magnet 36 is arranged substantially perpendicularly in relation to the longitudinal extent 54 of the ancillary handle 26*a*, whereas in FIG. 6*f* the plane through the boundary surface between the north pole and the south pole of the magnet 36 is arranged substantially parallel to the longitudinal extent 54 of the ancillary handle 26*a*.

Figure 6G:
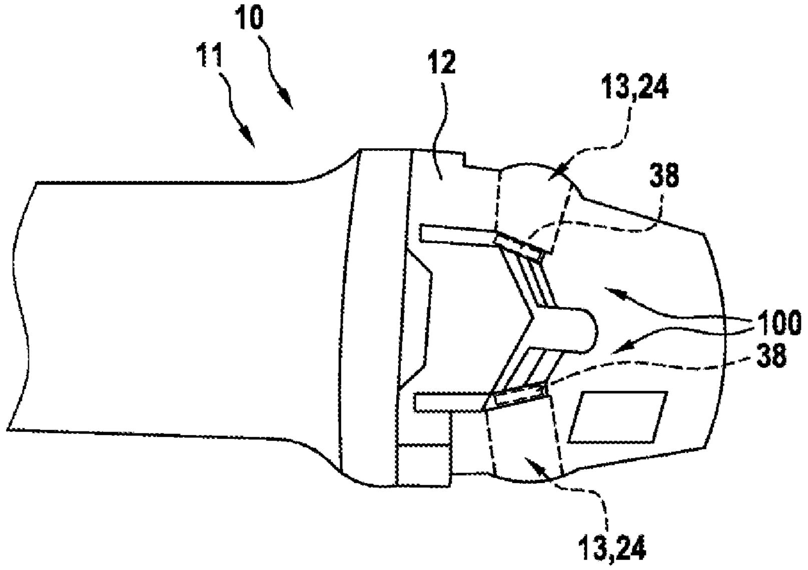
Figure 6H:
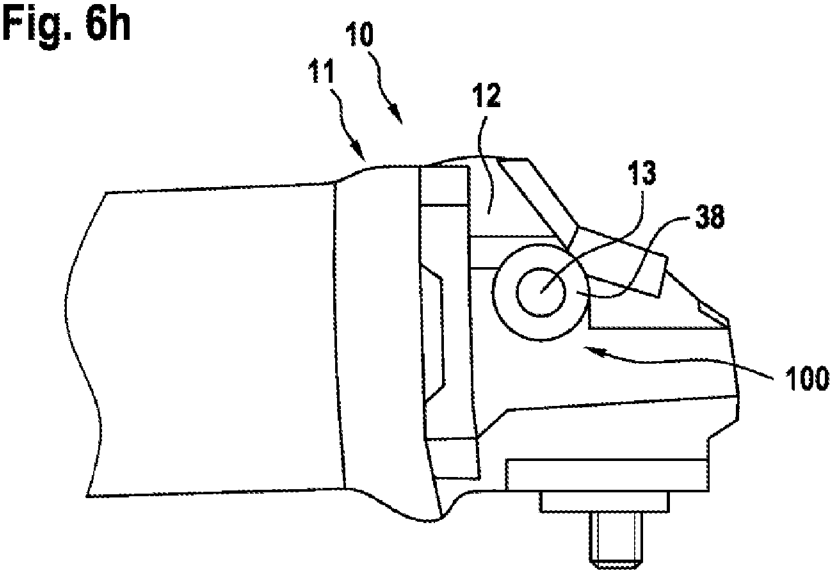

Differing positions of a magnetic field sensor 38 assigned to a detection unit 100 are shown in FIGS. 6*g* and *h*. The magnetic field sensor 38 may be realized, exemplarily, as a Hall sensor or as a reed switch. The hand-held power tool 10 has two mutually opposite threaded holes 13, which are realized as a machine-side contact element 24, on the transmission housing part 12. In FIG. 6*g*, the magnetic field sensor 38 is arranged at the end of the threaded hole 13. As a result of the magnetic field sensor being arranged inside the transmission housing part 12, the magnetic field sensor is advantageously protected against damage. Alternatively, it is also conceivable for the magnetic field 38 sensor to be arranged around the threaded hole 13, as shown in FIG. 6*g*. The arrangement of the magnet 36 and that of the magnetic field sensor 38 of the detection unit 100 are advantageously matched to each other. For example, the arrangement of the magnet 36 from FIG. 6*a* corresponds to the arrangement of the magnetic field sensor 38 from FIG. 6*g*, and the arrangement of the magnet 36 from FIG. 6*d* corresponds to the arrangement of the magnetic field sensor 38 from FIG. 6*h*.

Figure 6I:
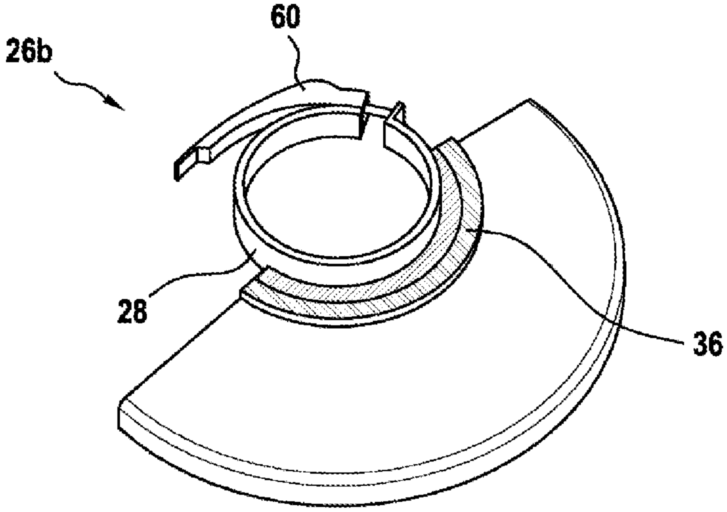
Figure 6J:
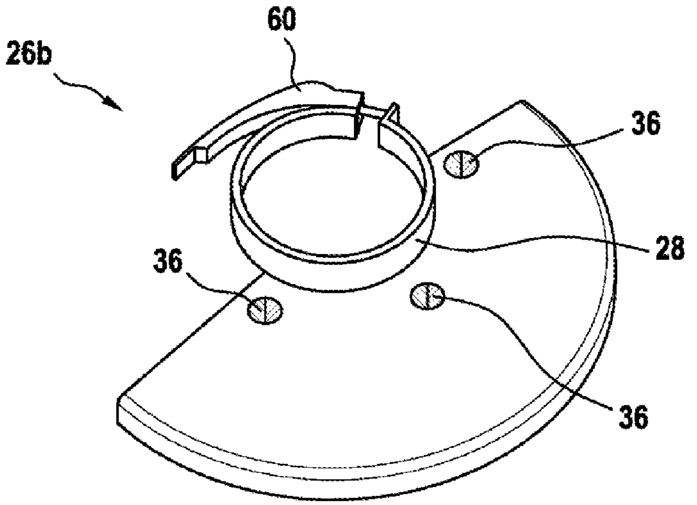
Figure 6K:
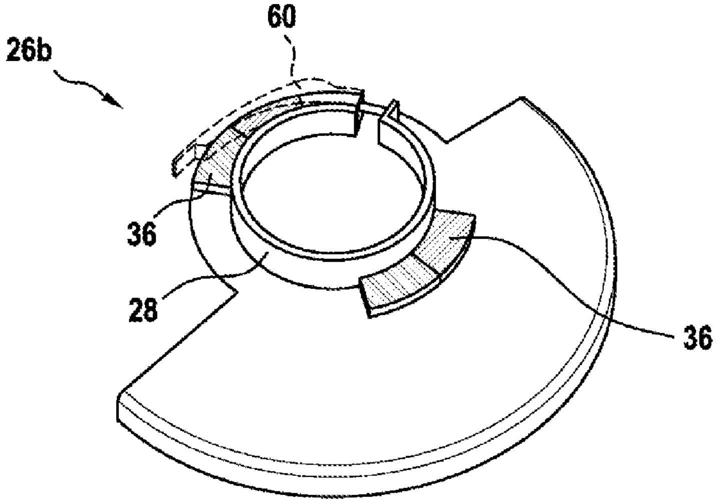

Shown in FIG. 6*i* to FIG. 6*k* is an accessory 26 that is realized as a protective hood 26*b*. The protective hood 26*b* has a protective-hood flange 60, which is realized such that it can be releasably connected to the transmission housing part 12 of the hand-held power tool 10. In particular, the protective-hood flange 60 is realized as an accessory-side contact element 28. The protective hood 26*b* has a magnet 36, which is arranged in the form of a semicircle around the protective-hood flange 60 (see FIG. 6*i*). Alternatively, other arrangements of the magnet 36 are also arranged around the protective hood flange 60, such as, for example, distributed on the protective hood 26*b* (see FIG. 6*f*), or symmetrically around the protective-hood flange 60 (see FIG. 6*k*).

Figure 6L:
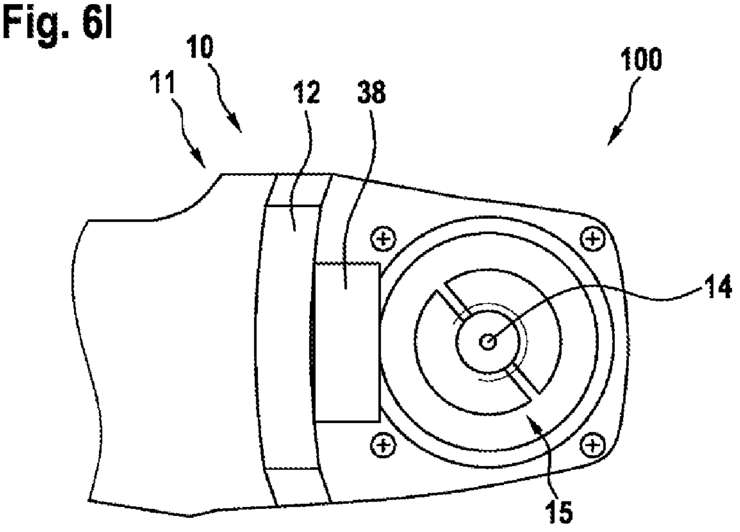

For the purpose of detecting the magnet 36 on the protective hood 26*b*, the hand-held power tool 10 may have a magnetic field sensor 38, which is arranged on the output side 15 of the housing 11 of the hand-held power tool 10, in particular of the transmission housing part 12 (see FIG. 6*l*). The output side 15 is, in particular, the side of the hand-held power tool 10 on which the work spindle 14 extends out from the housing 11 of the hand-held power tool 10.

The detection unit 100 is designed, in particular, to detect connection of the machine-side contact element to the accessory-side contact element 28. Advantageously, the magnetic field sensor 38 and the magnet 36 are arranged in such a manner that a connection is only detected as soon as the accessory 26 is fully fitted to the housing 11 of the hand-held power tool 10. In FIG. 6, the detection unit 100 senses the position of the magnet 36 by means of the magnetic field sensor 38. The drive unit 20 is advantageously realized such that, if the position of the magnet 36 corresponds to a properly fitted state of the accessory 26, it can be supplied with current via the electronics unit 55.

Figure 7:
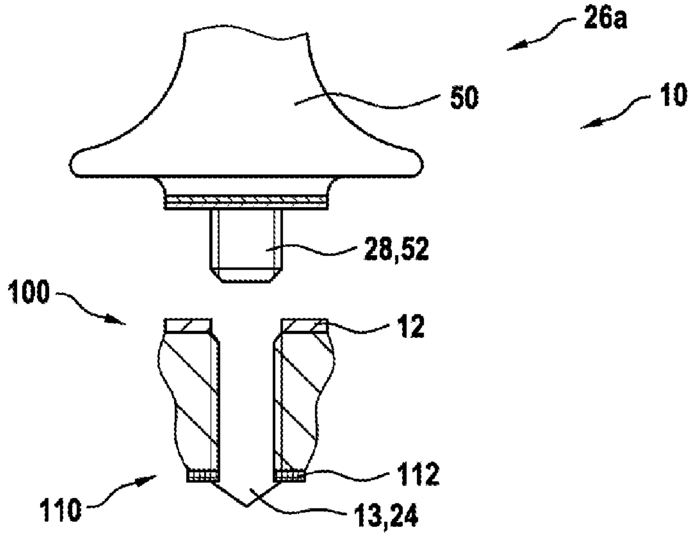
FIG. 7 a detail of a further embodiment of a hand-held power tool and a detail of a further alternative embodiment of an associated accessory, in a schematic representation, FIG. 8*a* a detail of an embodiment of a hand-held power tool having a detection unit, which comprises a pressure sensor element, and a detail of an embodiment of an associated accessory, in a schematic representation, FIG. 8*b* a detail of an alternative embodiment of a hand-held power tool according to FIG. 8*a*, in a schematic representation, FIG. 8*c* a detail of a further alternative embodiment of a hand-held power tool according to FIG. 8*a*, in a schematic representation, FIG. 9*a* a detail of an embodiment of a hand-held power tool having a detection unit, which comprises an air-pressure sensor element, and a detail of an embodiment of an associated accessory, in a schematic representation, FIG. 9*b* a detail of an alternative embodiment of a hand-held power tool and of an accessory according to FIG. 9*a*, in a schematic representation.

FIG. 7 shows an alternative embodiment of the detection unit 100. The detection unit 100 comprises a capacitive proximity switch 110, which is designed to detect materials that affect the electric field of the capacitive proximity switch 110. The capacitive proximity switch 110 in FIG. 7 exemplarily comprises a coil 112, which is realized as part of an electromagnetic resonant circuit. The coil 112 is arranged around the machine-side contact element 24, which is realized, exemplarily, as a threaded hole 13. The accessory 26 is realized, exemplarily, as an ancillary handle 26*a*, and comprises an accessory-side contact element 28 that is realized as a threaded stem 52. The accessory-side contact element 28 is composed, exemplarily, of a magnetoresistive material. The resonant circuit advantageously oscillates on its resonant frequency. If the accessory-side contact element 28 penetrates the opening formed by the coil 112, at least partly, the resonant oscillation of the resonant circuit is affected, in particular damped. The detection unit 100 is designed, in particular, to detect this damping.

Figure 8A:
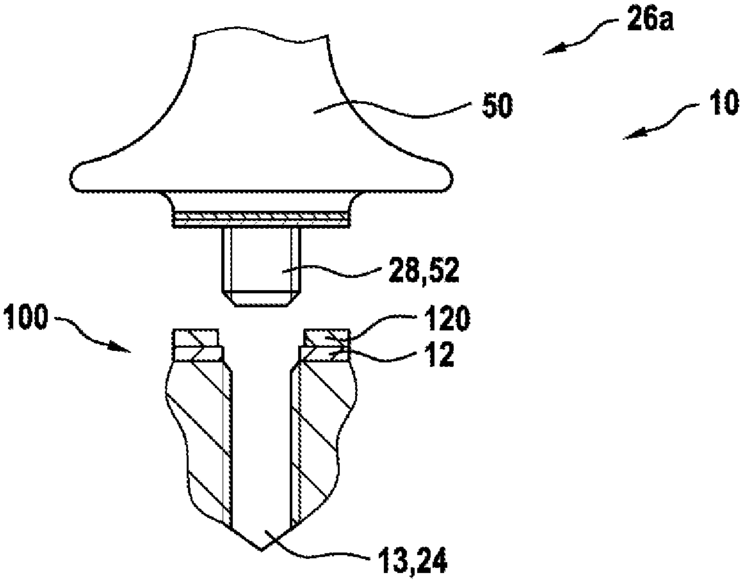
Figure 8B:
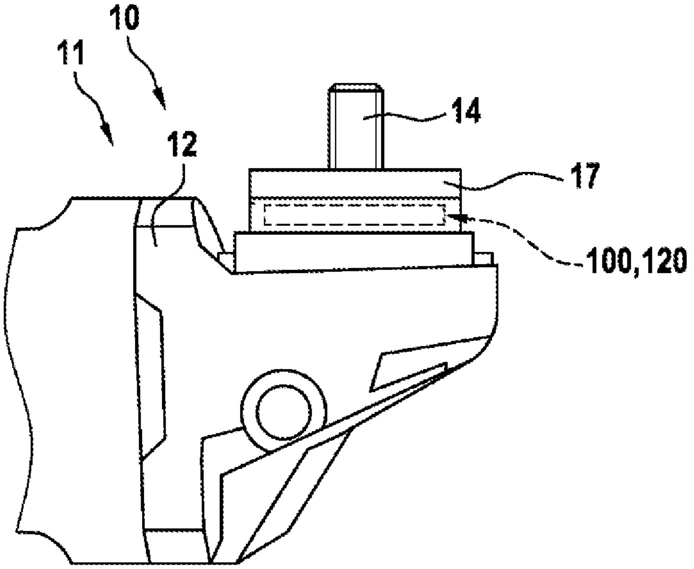
Figure 8C:
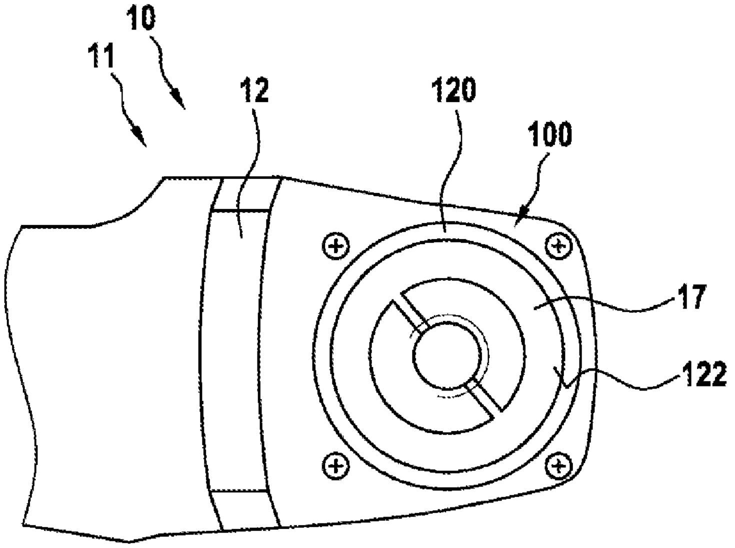

A further embodiment of the detection unit 100 is shown in FIG. 8*a-c*. The detection unit 100 comprises, in particular, at least one pressure sensor element 120, which is designed to detect the contact pressure of the accessory 26 on the housing 11 of the hand-held power tool 10. The pressure sensor element 120 is realized, exemplarily, as a piezoelectric pressure sensor element, and is arranged on the outer surface of the housing 11 of the hand-held power tool 10, in particular on the outer surface of the transmission housing part 12. Advantageously, the pressure sensor element 120 is arranged in such a manner that, in the fitted state, the grip part 50 of the ancillary handle 26*a* acts directly upon the pressure sensor element 120 and thereby effects a contact pressure upon the pressure sensor element 120.

FIG. 8*b* shows an alternative arrangement of the pressure sensor element 120. The pressure sensor element 120 is arranged, exemplarily, in a bearing flange 17 of the transmission housing part 11. In the fitted state, the accessory-side contact element 28, in the form of a protective-hood flange 60, acts upon the pressure sensor element 120. Advantageously, this arrangement can detect the fastening of a protective hood 26*b*.

FIG. 8*c* shows an alternative embodiment of the pressure sensor element 120. The pressure sensor element 120 is exemplarily arranged in the form of a circle along the outer surface of the bearing flange 17 of the transmission housing part 12. The pressure sensor element 120 is realized, in particular, as a touch-sensitive surface 122. The touch-sensitive surface 122 is realized as part of a capacitor unit. In the fitted state, the accessory 26 acts upon the touch-sensitive surface so as to effect a deformation of the touch-sensitive surface 122, in particular a deflection by a few μm. The deformation of the touch-sensitive surface 122 has a direct effect on the capacitance of the capacitor unit. Advantageously, the change in the capacitance of the capacitor unit enables fastening of the accessory to the housing 11 of the hand-held power tool 10 to be detected. Alternatively, it is also conceivable for the pressure sensor element 120, in particular the touch-sensitive surface 122, to be arranged at the end of a threaded hole 13 of the hand-held power tool 10.

Figure 9A:
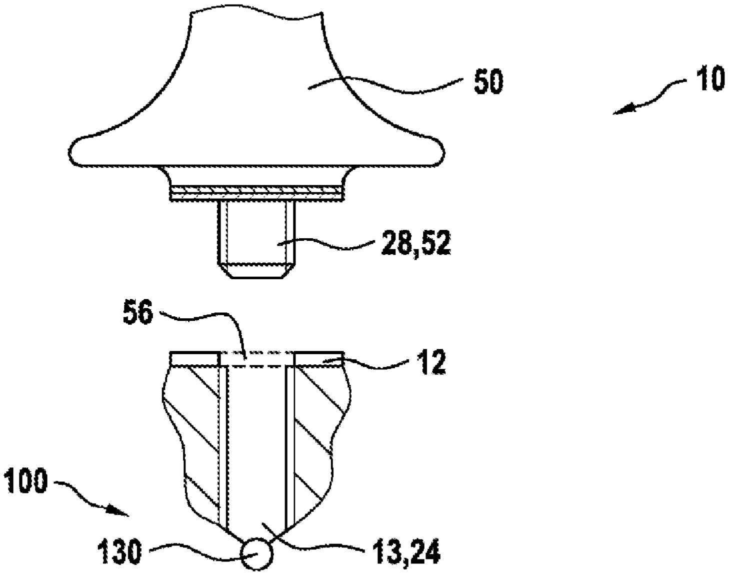
Figure 9B:
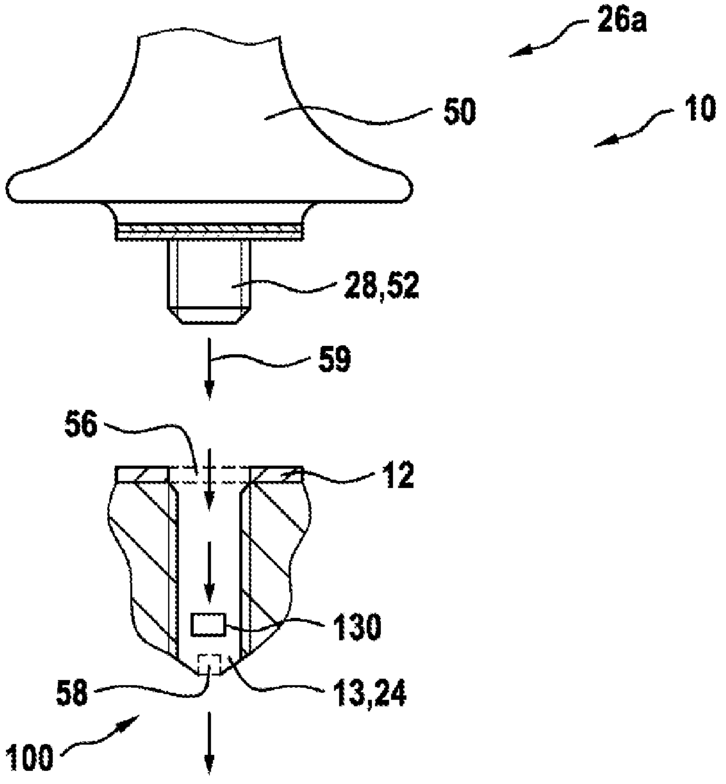

A further alternative embodiment of the detection unit 100 is shown in FIG. 9*a* and FIG. 9*b*. The detection unit 100 comprises an air-pressure sensor element 130, which is designed to determine the air pressure. In FIG. 9*a*, exemplarily, a static change in air pressure is detected. The machine-side contact element 24 is realized as a threaded hole 13 of the transmission housing part 12, and the accessory-side contact element 28 is realized as a threaded stem 52 of an ancillary handle 26*a*. The air-pressure sensor element 130 is arranged in a space spanned by the threaded hole 13. In particular, the air-pressure sensor element 130 is arranged at an end of the threaded hole 13 that is opposite an inlet opening 56 of the threaded bore 13. Via the inlet opening 56 of the threaded hole 13, the threaded stem 52 of the ancillary handle 26*a* is accommodated in the transmission housing part 12. In the fitted state, the ancillary handle 26*a* is screw-connected to the housing 11 of the hand-held power tool 10, as a result of which the space spanned by the threaded hole 13 is closed in a substantially air-tight manner. As a result of the screwing-in, the air in the space spanned by the threaded hole 13 is compressed, causing the pressure to be increased locally. The detection unit 100, in particular the air-pressure sensor element 130 of the detection unit, is advantageously designed to detect the pressure increase.

Alternatively, it is also conceivable for a dynamic air-pressure change to be detected by the detection unit 100, as shown exemplarily in FIG. 9*b*. In this exemplary embodiment, the space spanned by the threaded hole 13 of the housing 11 of the hand-held power tool 10 has a further through-opening 58, besides the inlet opening 56. The through-opening 58 is arranged, exemplarily, at the end of the space, spanned by the threaded hole 13, that is opposite the inlet opening 56. The hand-held power tool 10 has a fan (not represented), which is designed to cool the drive unit 20 of the hand-held power tool 10. Advantageously, the through-opening 58 is arranged in the housing 11 of the hand-held power tool 10 in such a manner that cooling air is drawn in, via the inlet opening 56 of the threaded hole 13, through the through-opening 58 of the threaded hole 13, toward the fan. In the fitted state, the threaded stem 52 of the ancillary handle 26*a* is arranged in the inlet opening 56 of the threaded hole 13, and thereby closes the latter. The discontinuity results in the cooling air stream 59 being interrupted, and in the formation of a negative pressure inside the housing. Arranged inside the housing 11 is the air-pressure sensor element 130, which is designed to detect the change in the air pressure. The air-pressure sensor element 130 is arranged, exemplarily, over the though-opening 58 of the threaded bore 13. Alternatively, it is also conceivable for the cooling air stream to be routed through the housing 11 of the hand-held power tool 10 in such a manner that it emerges from the housing via the inlet opening 56 of the threaded hole 13. In this case, closing of the inlet opening 56 results in a negative pressure, which can likewise be detected by the air-pressure sensor element 130.

It is likewise conceivable for the fastening of an accessory 26 in the form of a protective hood 26*b* to be detected by means of an air-pressure sensor element 130, as only described in the following, but not shown by a figure. In a manner similar to the previous embodiment, the bearing flange of the transmission housing pat may have a through-opening, the air-pressure sensor element being arranged along the direction of flow, between the through-opening and the fan. In the fitted state, the through-opening in the bearing flange is advantageously covered by the protective-hood flange in such a manner that the cooling air flow through the through-opening is interrupted and, depending on the direction of flow, a positive pressure or a negative pressure is produced, which can be detected by the air-pressure sensor element.

The invention claimed is:

1. A hand-held power tool, comprising:

a housing including at least one machine-side contact element;

an accessory including at least one accessory-side contact element, the machine-side contact element and the accessory-side contact element configured to be releasably connected to each other; and a detection unit configured to detect mechanical fastening of the accessory to the housing, the detection unit including the machine-side contact element, wherein the machine-side contact element is a magnetic field sensor and the accessory-side contact element is a magnet, and wherein the accessory is an ancillary handle configured to be gripped by an operator of the hand-held power tool, the magnet arranged in a threaded stem of the ancillary handle.

2. The hand-held power tool as claimed in claim 1, further comprising:

a motor housing part; and an electromotive drive unit arranged in the motor housing part and configured to drive a work spindle.

3. The hand-held power tool as claimed in claim 2, further comprising:

an electronics unit arranged in the hand-held power tool and configured to supply current to the electromotive drive unit.

4. The hand-held power tool as claimed in claim 3, wherein:

in response to the machine-side contact element and the accessory-side contact element connecting to each other, the electronics unit supplies current to the electromotive drive unit; and the accessory is in a fitted state.

5. The hand-held power tool as claimed in claim 1, wherein the detection unit includes a radar sensor element.

6. A hand-held power tool, comprising:

a housing;

a protective hood having a releasable connection to the housing, the protective hood configured to protect an operator of the hand-held power tool, during operation of the hand-held power tool, against sparks and/or material particles produced during operation of the hand-held power tool, and/or against fragments of a disk, broken during operation;

a magnetic field sensor arranged on an output side of the housing;

at least one magnet arranged on the protective hood proximate to the releasable connection; and a detection unit configured to detect mechanical fastening of the protective hood to the housing depending on a state of a releasable connection between the magnetic field sensor and the at least one magnet.

7. The hand-held power tool as claimed in claim 1, wherein the detection unit includes an electrical connection element.

8. A hand-held power tool, comprising:

a housing including at least one machine-side contact element; and an accessory including at least one accessory-side contact element, wherein:

the machine-side contact element and the accessory-side contact element are configured to be releasably connected to each other, the machine-side contact element is at least two, spaced-apart electrical connection elements, and the accessory-side contact element is a threaded stem of an ancillary handle, the threaded stem including electrically conductive material that forms an electrical bridge between the electrical connection elements when the ancillary handle is in a fitted state.

9. The hand-held power tool as claimed in claim 1, wherein the detection unit includes a capacitive proximity switch.

10. The hand-held power tool as claimed in claim 1, wherein the detection unit includes a pressure sensor element configured to detect a contact pressure of the accessory upon the housing.

11. The hand-held power tool as claimed in claim 1, wherein the detection unit includes an air-pressure sensor element configured to detect an air pressure.

12. The hand-held power tool as claimed in claim 3, further comprising:

at least one switching element configured to be actuated when the accessory is fitted on the hand-held power tool and configured to generate at least one item of information indicating that the accessory has been fitted to the hand-held power tool, wherein, upon actuation of the switching element the at least one item of information is relayed to the electronics unit via at least one electrical conductor.

13. The hand-held power tool as claimed in claim 3, further comprising:

at least one safety element configured to communicate with at least one of the hand-held power tool, the electronics unit, and a mobile device.

14. The hand-held power tool as claimed in claim 1, wherein the hand-held power tool is an angle grinder.

15. The hand-held power tool as claimed in claim 1, wherein the housing is a transmission housing part.

16. The hand-held power tool as claimed in claim 6, wherein the housing defines a bearing flange, and wherein the protective hood has a protective-hood flange configured to be releasably connected to the bearing flange.

17. The hand-held power tool as claimed in claim 16, wherein the magnet is arranged at least partially around the protective-hood flange.

18. The hand-held power tool as claimed in claim 16, wherein the magnet includes at least two magnets spaced apart and distributed around the protective-hood flange.

19. The hand-held power tool as claimed in claim 8, wherein the housing defines a threaded hole into which the threaded stem is threadedly engaged, a portion of the electrical bridge passing through the threaded hole.

20. The hand-held power tool as claimed in claim 19, wherein the electrical bridge is formed between the electrical connection elements only when the threaded stem is threadedly engaged in the threaded hole to a predetermined extent so as to achieve the fitted state.

* * * * *